US008829700B2

(12) United States Patent  (10) Patent No.: US 8,829,700 B2
Wong et al.  (45) Date of Patent: Sep. 9, 2014

(54) WIND TURBINE NACELLE COMPRISING A HEAT EXCHANGER ASSEMBLY

(75) Inventors: Voon Hon Wong, Singapore (SG); Ravi Kandasamy, Singapore (SG); Srikanth Narasimalu, Singapore (SG); Gerner Larsen, Hinnerup (DK); Tusitha Abeyasekera, Aarhus N (DK); Peter C. Knudsen, Aarhus (DK)

(73) Assignee: Vestas Wind Systems A/S, Aarhus N. (DK)

( * ) Notice: Subject to any disclaimer, the term of this patent is extended or adjusted under 35 U.S.C. 154(b) by 12 days.

(21) Appl. No.: 13/513,102

(22) PCT Filed: Dec. 1, 2010

(86) PCT No.: PCT/EP2010/068642
§ 371 (c)(1),
(2), (4) Date: May 31, 2012

(87) PCT Pub. No.: WO2011/067290
PCT Pub. Date: Jun. 9, 2011

(65) Prior Publication Data
US 2012/0235421 A1  Sep. 20, 2012

Related U.S. Application Data

(60) Provisional application No. 61/265,546, filed on Dec. 1, 2009.

(30) Foreign Application Priority Data

Dec. 1, 2009  (DK) .................................. 2009 70237

(51) Int. Cl.
*F03D 9/00*  (2006.01)
*H02P 9/04*  (2006.01)
*F03D 11/00*  (2006.01)

(52) U.S. Cl.
CPC ............. *F03D 11/00* (2013.01); *F05B 2260/20* (2013.01); *Y02E 10/722* (2013.01); *Y02E 10/726* (2013.01)
USPC ............................................. 290/44; 290/55

(58) Field of Classification Search
USPC ....................................................... 290/44, 55
See application file for complete search history.

(56) References Cited

U.S. PATENT DOCUMENTS 6,157,539 A * 12/2000 Wagner et al. ................ 361/704
6,676,122 B1 * 1/2004 Wobben .......................... 290/55

(Continued)

FOREIGN PATENT DOCUMENTS

EP        1647779 A2   4/2006
WO     2005060370 A2   7/2005

(Continued)

OTHER PUBLICATIONS

International Search Report from counterpart PCT Application No. PCT/EP2010/068642 mailed on May 17, 2011 (2 pages).

(Continued)

*Primary Examiner* — Pedro J Cuevas
(74) *Attorney, Agent, or Firm* — Wood, Herron & Evans, LLP

(57) ABSTRACT

A heat exchanger assembly for cooling a heat-generating component, such as a generator or power electronics module, within a wind turbine nacelle comprises a thermoelectric element, such as a Peltier element, having a first section arranged in a first region of relatively high temperature in contact with the heat-generating component or in the vicinity thereof, and a second section arranged in a second region of a relatively low temperature. The thermoelectric element is configured to transfer heat from the first region of relatively high temperature to the second region of relatively low temperature with consumption of electrical energy. A source of electrical energy is provided for the thermoelectric element, and a control unit may be provided for controlling the energy supply in order to control the temperature of the component or surface area cooled by the thermoelectric element. A further cooling element including a so-called heat pipe may be provided to enhance cooling efficiency.

21 Claims, 10 Drawing Sheets

(56) References Cited

U.S. PATENT DOCUMENTS

Figure 1:
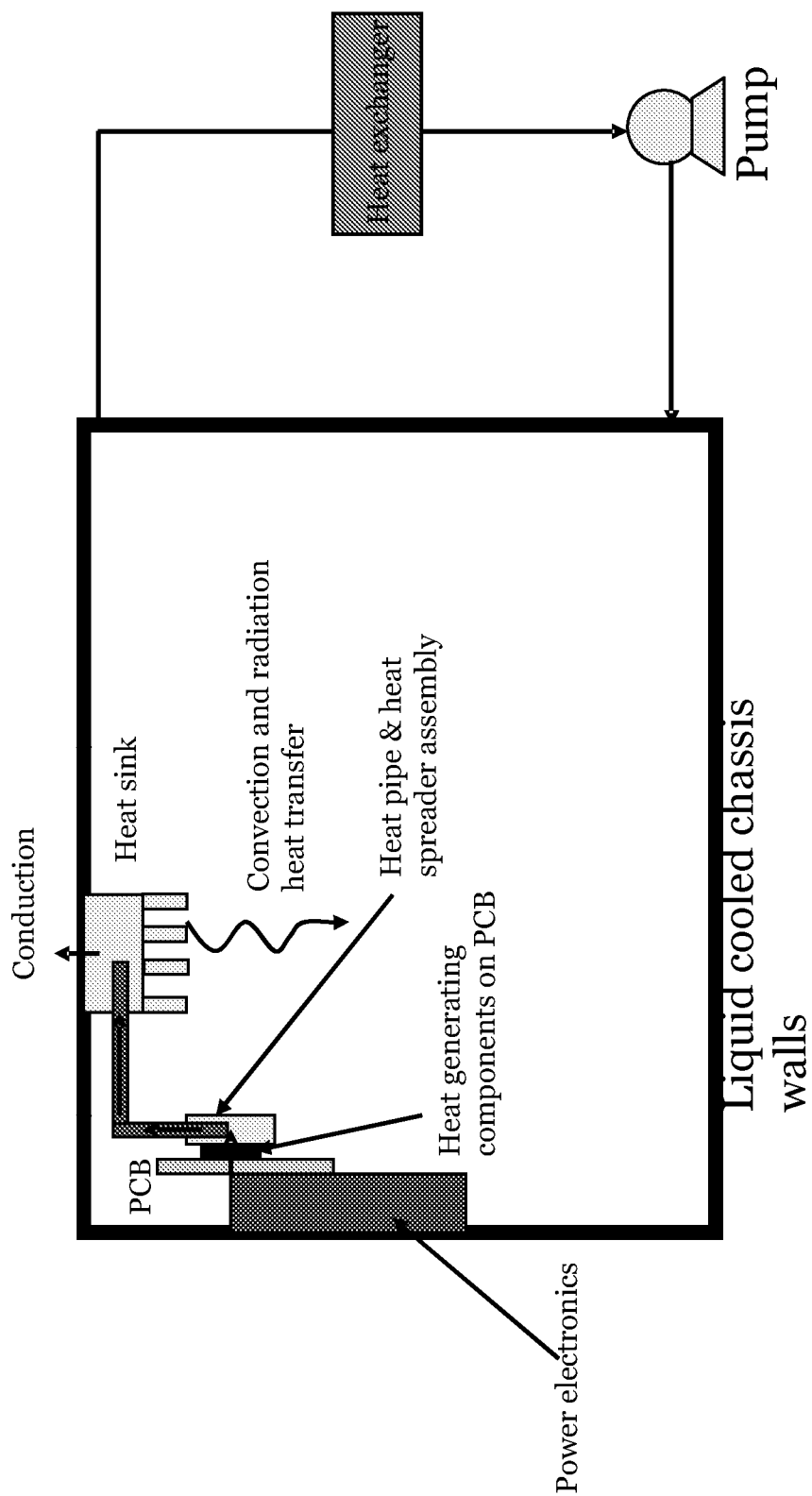

| | | | |
|---|---|---|---|
| 6,924,979 B2* | 8/2005 | Clements et al. | 361/695 |
| 7,057,305 B2* | 6/2006 | Kruger-Gotzmann et al. | 290/55 |
| 7,111,668 B2* | 9/2006 | Rurup | 165/134.1 |
| 7,168,251 B1* | 1/2007 | Janssen | 60/641.1 |
| 7,370,479 B2 | 5/2008 | Pfannenberg | |
| 7,748,946 B2* | 7/2010 | Wan | 415/1 |
| 7,837,126 B2* | 11/2010 | Gao | 236/44 C |
| 7,895,847 B2* | 3/2011 | Larsen | 62/93 |
| 7,905,104 B2* | 3/2011 | Matesanz Gil et al. | 62/259.1 |
| 7,967,550 B2* | 6/2011 | Grevsen et al. | 415/1 |
| 7,997,855 B2* | 8/2011 | Bagepalli et al. | 415/114 |
| 8,047,774 B2* | 11/2011 | Bagepalli | 415/176 |
| 8,052,383 B2* | 11/2011 | Frokjaer | 415/178 |
| 8,058,742 B2* | 11/2011 | Erdman et al. | 290/55 |
| 8,206,112 B2* | 6/2012 | Tietze et al. | 416/175 |
| 8,360,715 B2* | 1/2013 | Matsuo et al. | 415/176 |
| 8,541,902 B2* | 9/2013 | Casazza et al. | 290/55 |
| 8,616,846 B2* | 12/2013 | Nanukuttan et al. | 416/1 |
| 2005/0006905 A1* | 1/2005 | Rurup | 290/55 |
| 2005/0167989 A1* | 8/2005 | Kruger-Gotzmann et al. | 290/55 |
| 2008/0290662 A1* | 11/2008 | Matesanz Gil et al. | 290/44 |
| 2008/0298964 A1* | 12/2008 | Rimmen | 416/39 |
| 2009/0200114 A1* | 8/2009 | Bagepalli et al. | 184/6.22 |
| 2009/0212560 A1* | 8/2009 | Larsen | 290/2 |
| 2010/0034653 A1* | 2/2010 | Frokjaer | 416/39 |
| 2010/0118492 A1* | 5/2010 | Larsen | 361/696 |
| 2010/0150704 A1* | 6/2010 | Grevsen et al. | 415/177 |
| 2011/0095539 A1* | 4/2011 | Tietze et al. | 290/55 |
| 2011/0255974 A1* | 10/2011 | Nanukuttan et al. | 416/146 R |
| 2012/0025537 A1* | 2/2012 | Sivalingam et al. | 290/55 |
| 2012/0050750 A1* | 3/2012 | Hays et al. | 356/519 |
| 2012/0061047 A1* | 3/2012 | Sivalingam et al. | 165/51 |
| 2012/0063890 A1* | 3/2012 | Sivalingam et al. | 415/177 |
| 2012/0086215 A1* | 4/2012 | Sivalingam et al. | 290/55 |
| 2012/0169053 A1* | 7/2012 | Tchoryk et al. | 290/44 |
| 2012/0274937 A1* | 11/2012 | Hays et al. | 356/337 |
| 2013/0061605 A1* | 3/2013 | de Rochemont | 62/3.5 |
| 2013/0199591 A1* | 8/2013 | Khan et al. | 136/206 |
| 2013/0283816 A1* | 10/2013 | Smith et al. | 60/784 |
| 2013/0292085 A1* | 11/2013 | Smith et al. | 165/10 |

FOREIGN PATENT DOCUMENTS

| | | |
|---|---|---|
| WO | 2006032515 A1 | 3/2006 |
| WO | 2008131766 A2 | 11/2008 |

OTHER PUBLICATIONS

Search Report from Danish Patent and Trademark Office issued in counterpart Danish Patent Application No. PA 2009 70237, mailed Jun. 29, 2010 (5 pages).

International Bureau, International Preliminary Report on Patentability issued in corresponding PCT/EP2010/068642 on Jun. 5, 2012, 7 pages.

* cited by examiner

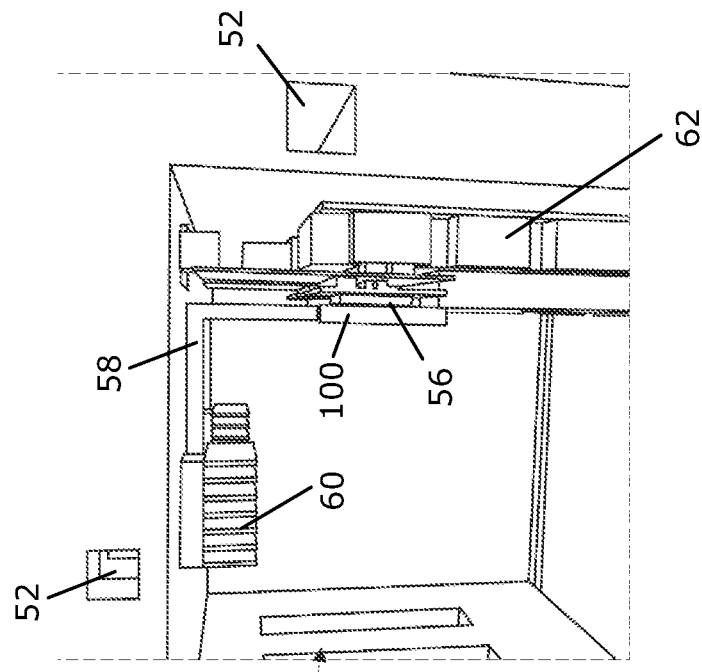
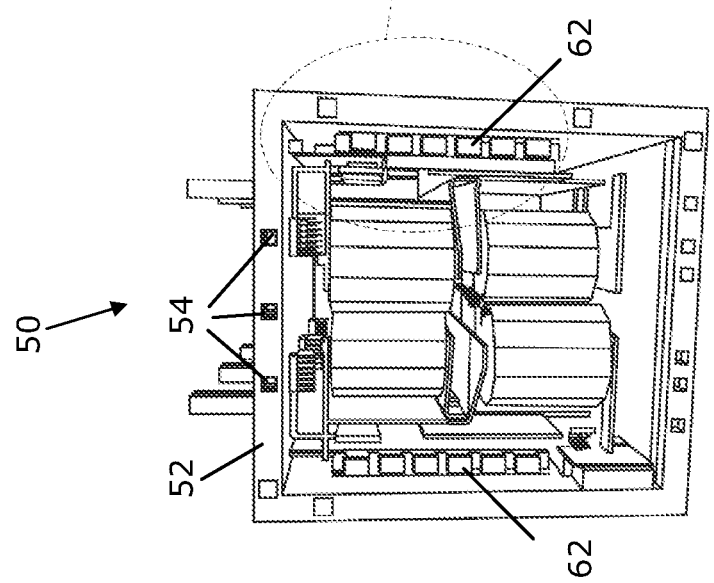
Fig. 4
Fig. 3

WIND TURBINE NACELLE COMPRISING A HEAT EXCHANGER ASSEMBLY

TECHNICAL FIELD

The present invention generally relates to cooling of heat-generating components within a wind turbine nacelle.

BACKGROUND OF THE INVENTION

In wind turbines, the nacelle houses components and systems necessary for converting mechanical energy into electricity. The components may range from heavy duty generators, gearboxes, brakes and transformers to small electronic components. These systems and components generate a significant amount of heat inside the nacelle. This heat has to be dissipated to outside ambient air for efficient operation of the nacelle components.

State of the art systems for removing heat from power electronics and heavy duty components include pumps or fans for circulating water or air between a region of relatively high temperature in, on or near the component or system to be cooled and a region of relatively low temperature, where heat is typically dissipated through fins or tube bundles to ambient air.

Heat from power electronics is normally dissipated to outside ambient air by a water cooled system, in which water is circulated between a relatively cold plate and a surface of the power electronics module.

It will be appreciated that the above air-to-air heat exchangers and air-to-water heat exchangers require pumps or fans as well as piping arrangements to circulate water. The cooling systems are consequently bulky, whereby installation thereof is a complex and expensive task due to the limited space available inside wind turbine nacelles. Moreover, systems including pumps and fans are susceptible to wear and ultimately break-down, which may result not only in interruption of the operation of the wind turbine, but also in damage to heavy duty components or electronics due to overheating thereof.

Further, the amount of heat to be removed from heat-generating components in wind turbine nacelles varies in dependence of external conditions, such as ambient temperature, as well as in dependence of the load on the wind turbine during operation. For example, when the wind turbine operates at high loads the amount of heat generated within the generator and within power electronics in the generator is higher than when the wind turbine operates at low loads, where less power is fed into the generator. Air-to-air or air-to-water heat exchangers are not accurately controllable in all circumstances, and though they are generally designed to provide a sufficient degree of heating, their energy consumption is often excessively high, because, as a safety measure, they are often adapted to provide an unnecessarily high degree of cooling. Yet, the electronic modules, such as in particular printed circuit boards (PCBs) heat up significantly due to the high power dissipations from e.g. generators, transformers and like components, which are typically housed within an enclosed space. With varying operating conditions, the PCBs can be heated and cooled quickly over a period of time, and due to the coefficient of thermal expansion mismatch within the PCBs, failures in the solder joints can occur with the repeated expansion and contraction of the materials within the PCBs.

SUMMARY OF THE INVENTION

It is an object of embodiments of the present invention to provide a wind turbine nacelle with a heat exchanger assembly, which is easily controllable. It is a further object of embodiments of the invention to provide a heat exchanger assembly, which offers additional cooling capacity. Further, it is an object of embodiments of the invention, which is suitable for cooling power electronics of a wind turbine generator, and which can be combined with other types of cooling systems. Further, it is an object of the invention to provide a heat exchanger assembly which is suitable for efficiently and accurately cooling confined areas or specific components, such as power electronic modules or their surfaces to keep such areas or components at a relatively constant or at a relatively low temperature.

Generally, the present invention provides a wind turbine nacelle, comprising:

at least one heat-generating component housed within the nacelle;

at least one heat exchanger assembly for cooling said at least one heat-generating component;

wherein the at least one heat exchanger assembly comprises a first cooling assembly comprising at least one thermoelectric element having a first section arranged in a first region of relatively high temperature in contact with the heat-generating component or in the vicinity thereof, the thermoelectric element further having a second section arranged in a second region of a relatively low temperature, the thermoelectric element being configured to transfer heat from the first region of relatively high temperature to the second region of relatively low temperature with consumption of electrical energy; and wherein the first cooling assembly further comprising a source of electrical energy connected to the thermoelectric element.

The invention further provides a method of cooling at least one heat-generating component housed within a wind turbine nacelle, the method comprising:

providing at least one heat exchanger assembly for cooling said at least one heat-generating component, wherein the at least one heat exchanger assembly comprises a first cooling assembly with at least one thermoelectric element, the method further comprising:

arranging a first section of the at least one thermoelectric element in a first region of relatively high temperature in contact with the heat-generating component or in the vicinity thereof; and arranging a second section of the at least one thermoelectric element in a second region of a relatively low temperature;

supplying electrically energy to the thermoelectric element, so as to cause it to transfer heat from the first region of relatively high temperature to the second region of relatively low temperature.

The heat pumping capacity of the thermoelectric element is controllable by the supply of electrical energy (current), thereby allowing components or surface areas, which are located in the vicinity of the thermoelectric element, to be kept at a lower and/or at a more constant temperature than if the entire heat-generating component was cooled by a common system for cooling the entire component or its housing.

Preferably by use of the Peltier effect, the thermoelectric element creates a heat flux between the junction of two different types of materials. The thermoelectric element may be a solid-state active heat pump which transfers energy (heat) from one side thereof to the other side against the temperature gradient. In doing so, the element consumes electrical energy. The thermoelectric element may hence constitute a cooling diode or a so-called solid state refrigerator.

In order to accurately control the heat pumping capacity of the first cooling assembly, there may be provided a control system configured to control the supply of electrical energy to the thermoelectric element. Accordingly, the thermoelectric element may e.g. be controlled to keep the area or component, which is being cooled by the first cooling assembly, at a constant temperature. Alternatively, such temperature and/or the cooling capacity of the thermoelectric element may be controllable in response to variable external conditions, such as the operating conditions of the wind turbine. In such case, the control system may comprise a unit for determining an operating condition of the wind turbine, in which case the control system is configured to control the supply of electrical energy to the thermoelectric element in response to said operating condition. For example, the operating condition may be the aerodynamic load on the wind turbine rotor or the speed of rotation of the rotor, ambient wind velocity, outside temperature, the temperature within the nacelle or within a component of the nacelle, etc. In one embodiment of the invention, the temperature of printed circuit boards (PCBs) may be kept constant even with varying loads due to varying wind speeds, by varying the supply current to the thermoelectric element.

According to one embodiment of the present invention, the at least one heat-generating component comprises a generator (also referred to as a converter) for converting mechanical energy of a rotational shaft of the wind turbine nacelle into electrical energy. Generators within wind turbine nacelles usually require cooling, and though heat exchangers based on water and/or air pumps are commonly to be applied in such context, the thermoelectric element provides an additional cooling effect, notably within restricted or confined areas, such as with respect to the cooling of electronic circuits. For example, the generator may comprise a control module having at least one PCB, in which case the thermoelectric element and/or other cooling elements of the heat exchanger assembly may be arranged to transfer heat away from the at least one PCB.

The supply of electrical energy to the thermoelectric element may be controllable to maintain a surface temperature of the PCB below 50 degrees Celsius. Hitherto, the surface temperature of PCBs has been around 95 degrees Celsius during operation of the wind turbine, and hence a reduction to 50 degrees Celsius or lower reduces the probability for solder joint failure with a reduction in peak PCB temperatures.

It will be understood that the thermoelectric element may be applied as a cooling means for other types of electronic components within the wind turbine nacelle, or generally as a cooling means for any kind of heat-generating component in the nacelle.

There may be provided more than a single thermoelectric element. For example, each of a plurality of thermoelectric elements may be arranged and configured to cool a specific component or surface area within the wind turbine nacelle, such as within the generator, e.g. a power control unit or a PCB thereof.

The thermoelectric element may conveniently be combined with other types of heat exchanger elements, such as with a second cooling assembly comprising a container which contains a working fluid, wherein the container is arranged such that a first section of the container is in a third region of relatively high temperature in contact with the heat-generating component or in the vicinity thereof, and such that a second section of the container is in a fourth region of relatively low temperature remote from the heat-generating component; and the working fluid is capable of evaporating at the first section of the container due to heat exchange with the high temperature region through a first wall of the first section of the container;

the evaporated working fluid is capable of being conveyed within the container from the first region thereof to the second region and of condensing at the second section of the container due to heat exchange with the low temperature region through a second wall of the second section of the container;

the second cooling assembly further comprises a structure allowing the condensed working fluid to be conveyed back from the second section of the container to the first section thereof.

Conveying of the working fluid from the second section of the container to its first section may occur under the action of capillary effect, e.g. in a wick structure, and/or under the action of gravity. The heat exchanger may hence be a passive component, which does not require power supply from external sources, and which does not rely on pumps or fans.

The heat-generating component may include one or more of a gearbox, a generator, a transformer, a brake, an oil pump, a vibration dampening device, a bearing, an electric or electronic component, including control electronics. The region of relatively high temperature is preferably a region on or immediately adjacent to an outer portion of the heat-generating component to be cooled. However, the high temperature region may also be a region within the component to be cooled, e.g. a space within a gearbox or generator housing.

In respect of cooling of electronic components, such as power electronics, the principle of a heat exchanger based on evaporation and condensing of a working fluid has been found to be particularly advantageous if the container is arranged with an outer surface thereof in overlapping abutment with an outer surface of the electronic component to be cooled. More specifically, the heat exchanger may be used to spread out the heat efficiently across the surface of the container of the heat exchanger, and so-called hot spots can thereby be avoided, which otherwise are a common source of device failure.

The container may be comprised in a housing having:
a first outer surface portion arranged in the region of relatively high temperature, and a second outer surface portion arranged in the region of relatively low temperature; where the container is arranged within the housing between the first and second outer surface portions; and wherein the structure allowing the condensed working fluid to be conveyed from the second section to the first section of the container comprises a wick structure lined to at least a portion of an inner wall of the container.

In one specific embodiment, the container is in the form of an elongated pipe-like member, and wherein the first and second sections thereof are located in respective opposite ends of the pipe-like member. The wick structure may be lined to an inner wall within the pipe-like member, so as to encapsulate an inner cavity in which the working fluid may evaporate.

The second cooling assembly, which e.g. includes the pipe-like member referred to above, may be configured to cool the first cooling assembly, which includes the thermoelectric element. Alternatively, the thermoelectric element may be used to cool the first cooling assembly, or the first and second cooling elements may be provided to directly cool separate components or distinct areas of a component. Accordingly, the container containing the working fluid may be arranged to transfer heat away from the thermoelectric element, with the first section of the container being arranged in contact with or in the vicinity of the second section of the thermoelectric element. In an alternative embodiment, the thermoelectric element is arranged to transfer heat away from the container containing the working fluid, with the first section of the thermoelectric element being arranged in contact with or in the vicinity of the second section of the container containing the working fluid.

In order to bring about an efficient heat pumping effect away from the first and/or the second cooling assembly, the heat exchanger assembly may further comprise a heat sink thermally connected to the first cooling assembly, i.e. the thermoelectric element and/or to the second cooling assembly, i.e. the container containing the working fluid. The heat sink may preferably be arranged to transfer heat to its surroundings by convection and/or radiation heat transfer. For example, there may be provided a heat spreader assembly arranged to connect the first and/or the second cooling assembly with the heat sink. The heat spreader assembly may comprise one or more thermally conductive elements interconnecting the first and/or the second cooling assembly with the heat sink.

In one embodiment, the heat exchanger assembly is arranged within a housing or chassis, e.g. the housing or chassis of a generator. In such case, the wind turbine nacelle may further comprises a cooling system for cooling the housing or chassis by means of closed cooling circuit comprising a pump for circulating a cooling medium in the cooling circuit along or across the housing or chassis, and a heat exchanger for transferring heat away from the cooling medium in the circuit. To achieve efficient heat transfer from the heat sink by way of conduction, the heat sink may be arranged near a wall of the housing or chassis, the walls of which may be used as conduits or support for conduits for the closed cooling circuit.

In the second cooling assembly, the low temperature region may be at an outer surface portion of the nacelle facing the exterior thereof so as to enhance heat transfer from the heat exchanger to the low temperature region due to flow of ambient air across the outer surface portion. The outer surface portion of the nacelle may be chosen to be a region of relatively high local velocity of wind, so as to further enhance convection heat transfer. Alternatively, the low temperature region may be provided at an inner surface of the nacelle facing the interior thereof. In both instances, a fan may be provided in order to enhance heat transfer from the heat exchanger to the low temperature region.

At least a portion of the container or of the housing may be embedded in a metal case, preferably of a metal having a high thermal conductivity, such as Copper (Cu).

In embodiments of the second cooling assembly, the working fluid may be selected from the group consisting of: $H_2$, Ne, $O_2$, $N_2$, $CH_4$, F-21, F-11, $C_6H_6$, $(CH_3)CO$, $(CH_3)OH$, $NH_3$, $H_2O$, Cs, K, Hg, Na, Li and Ag. The aforementioned working fluids are generally applicable in the following applications:

Cryogenic heat exchangers: $H_2$, Ne, $O_2$, $N_2$, $CH_4$
Low temperature heat exchangers: $O_2$, $N_2$, $CH_4$, F-21, F-11, $C_6H_6$, $(CH_3)CO$, $(CH_3)OH$, $NH_3$, $H_2O$, Cs, K, Hg, Na
High temperature heat exchangers: Cs, K, Hg, Na, Li, Ag The wick structure for conveying the condensed working fluid back from the second section of the container to its first portion may, for example, comprise a sintered powder metal screen.

In order to improve heat transfer at the low temperature region of the heat exchanger, an outer surface thereof may be provided with a plurality of fins made up of, e.g. extruded, pin-like, bonded or folded fins. The fins may have any suitable shape and configuration, such as elliptical, cross-cut, straight etc.

The present invention further provides a wind turbine comprising a nacelle as discussed above.

Figure 2:
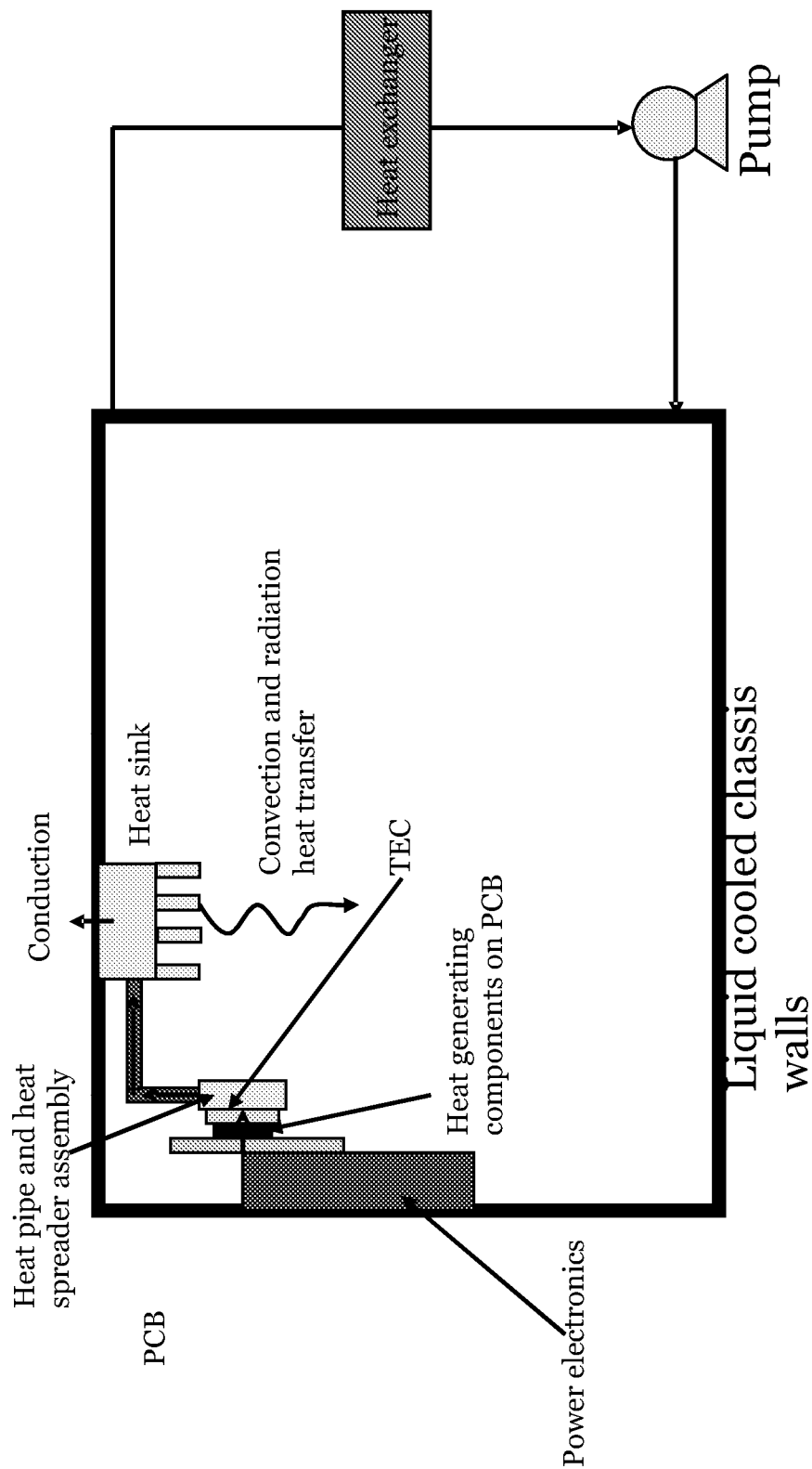
Figure 5:
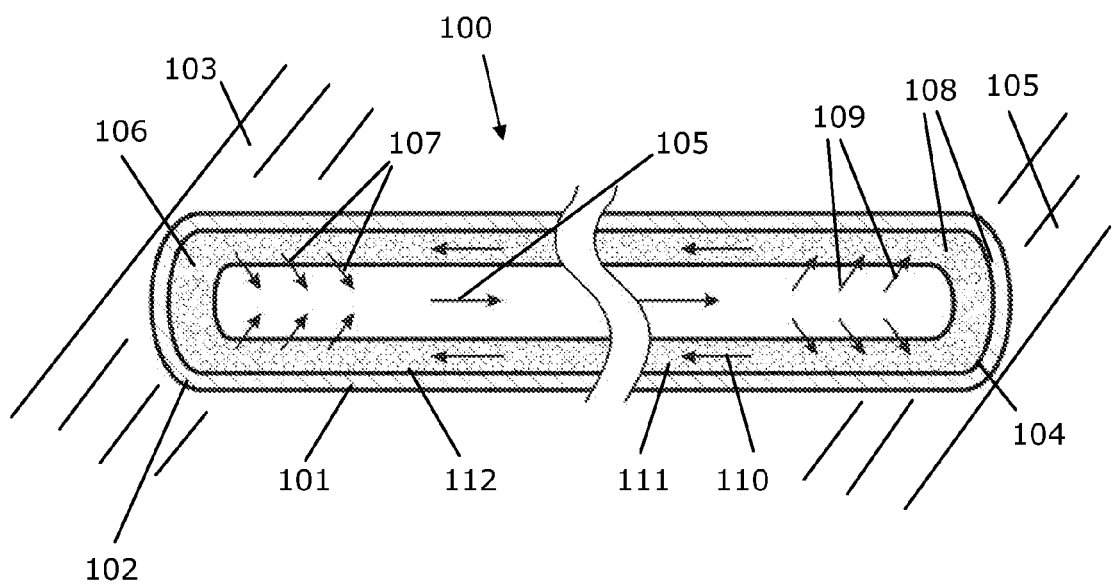
Figure 6:
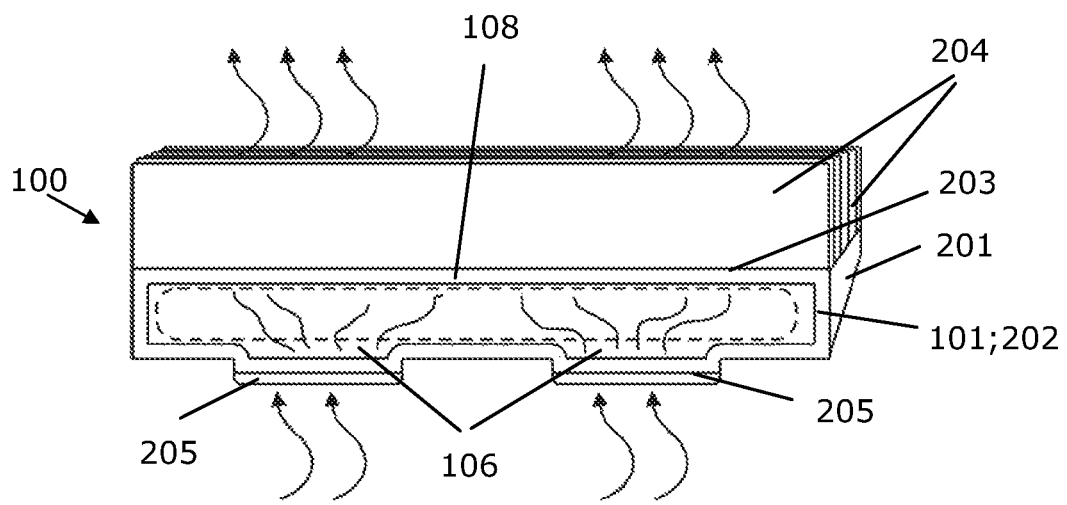
Figure 7:
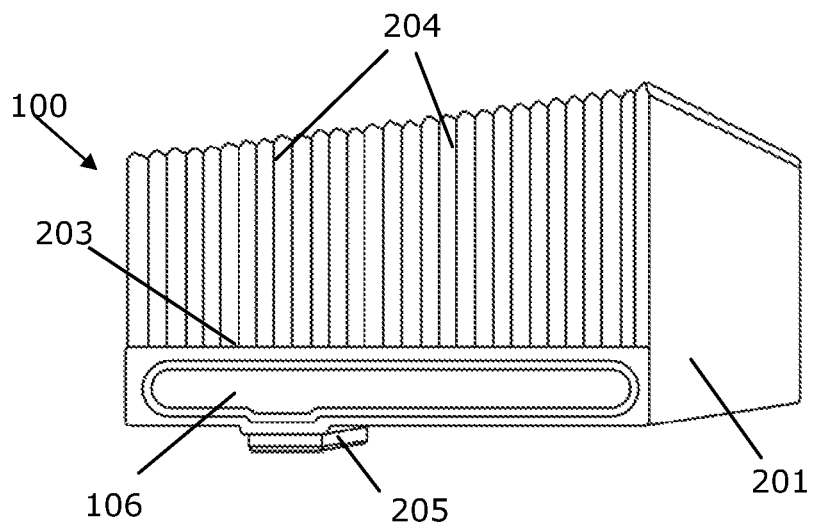
Figure 8:
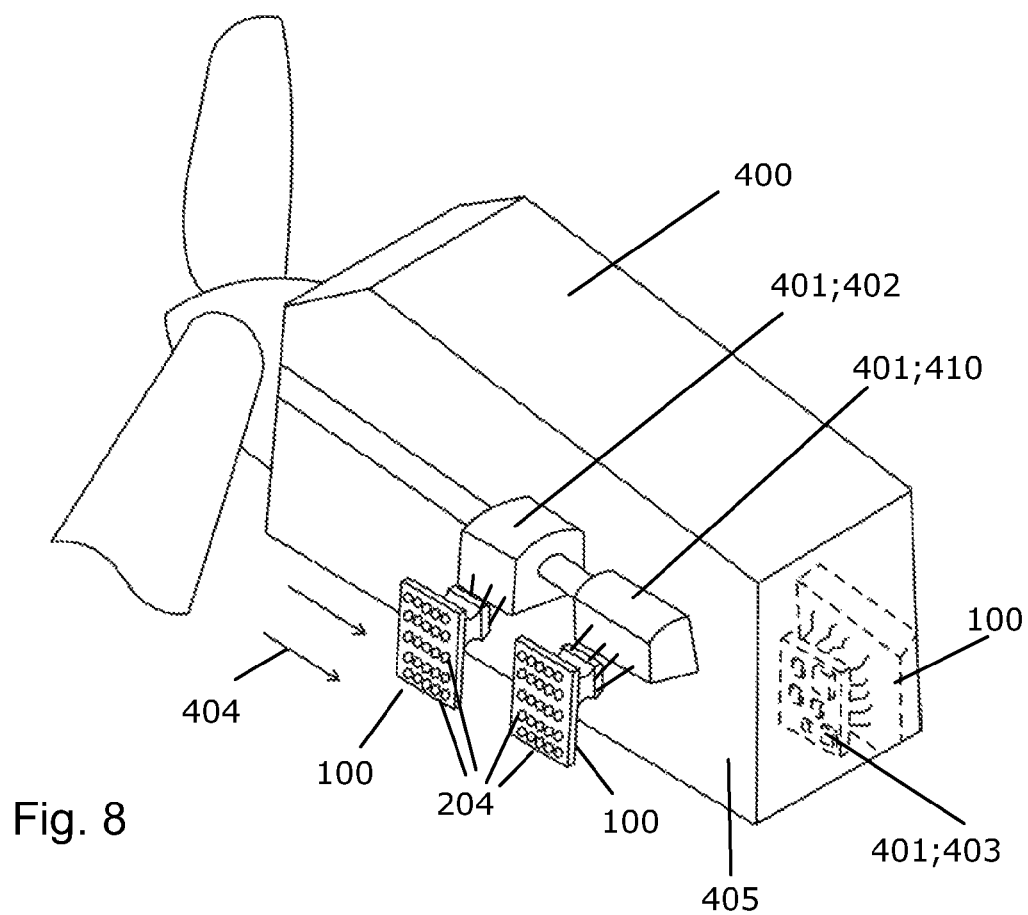
Figure 9:
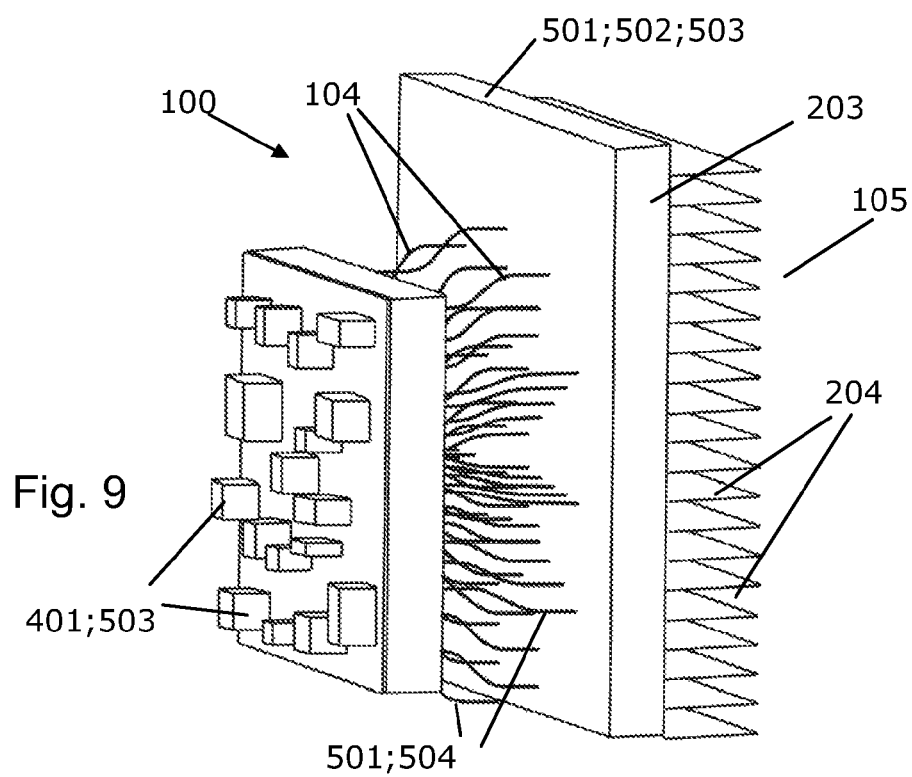
Figure 10:
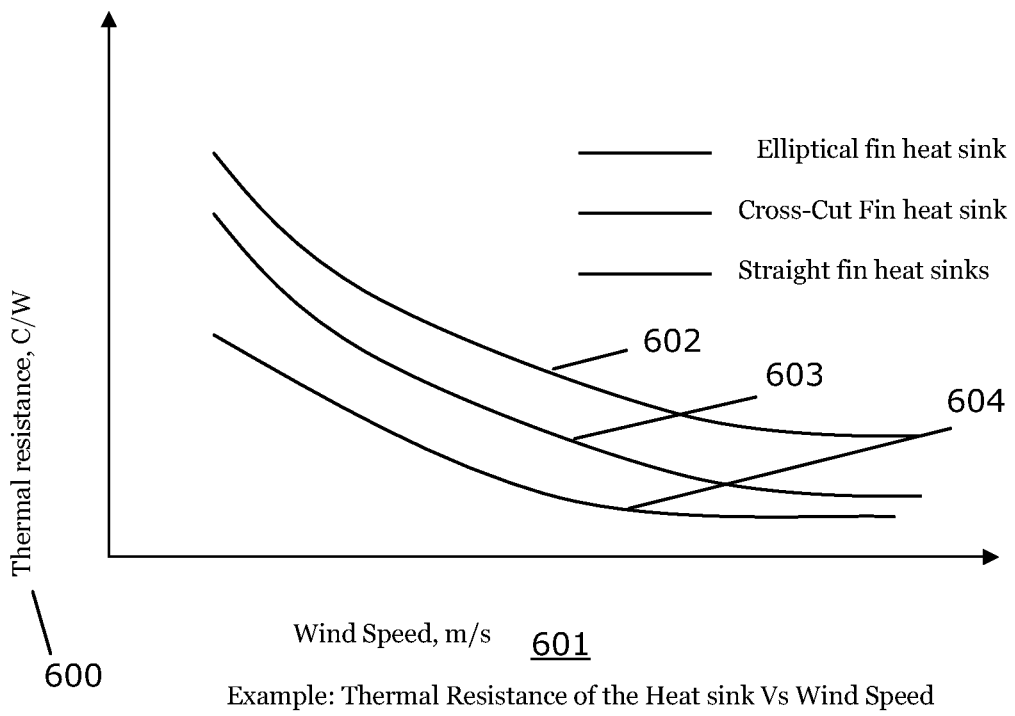
Figure 11:
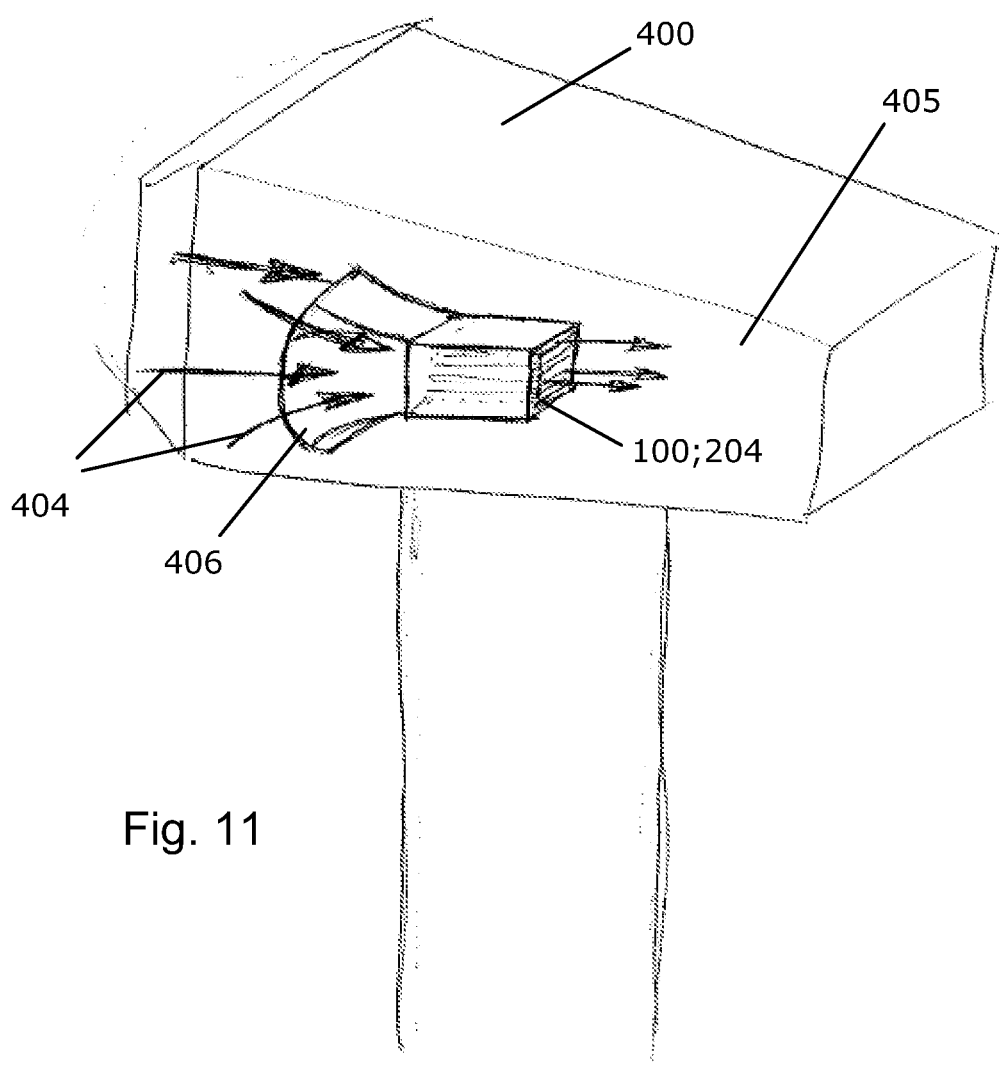

The invention will now be described further with reference to the drawings, in which:

FIGS. 1 and 2 generally illustrate embodiments of a heat exchanger assembly for a liquid cooled chassis of e.g. a wind turbine generator within a wind turbine nacelle;

FIGS. 3 and 4 show an embodiment of a liquid cooled chassis of e.g. a wind turbine generator incorporating a heat exchanger assembly;

FIG. 5 illustrates a pipe-like shaped cooling assembly according to one embodiment of the second cooling assembly of the present invention, FIGS. 6-7 illustrate a further embodiment of a pipe-like cooling assembly according to a further embodiment of the second cooling assembly of the present invention, FIG. 8 shows a wind turbine nacelle comprising a number of heat exchangers according to the invention, FIG. 9 is a sketch of a modular heat exchanger, FIG. 10 shows the dependency of the thermal resistance over a heat exchanger on the velocity of the cooling wind, FIG. 11 is a sketch of a heat exchanger according to the invention arranged in a nacelle wall and comprising a cover for increasing the local wind velocity, and FIGS. 12-16 show different heat-pipe based cooling assemblies according to embodiments of the second cooling assembly of the present invention.

FIGS. 1 and 2 illustrate two embodiments of a heat exchanger assembly incorporated in a liquid cooled chassis in a wind turbine nacelle. The embodiment of FIG. 2 comprises a thermoelectric component for achieving an enhanced cooling effect, whereas the embodiment of FIG. 1 comprises no thermoelectric element. The chassis may itself house a heavy-duty component, such as the generator, or it may be arranged in the close vicinity of such a component. A power electronics module is arranged on an interior surface of the chassis wall with a printed circuit board (PCB) arranged on a surface of the power electronics module facing the interior of the chassis. The PCB comprises heat-generating components. In FIG. 1, these heat generating components are cooled by a second cooling assembly in the form of a heat pipe and heat spreader assembly thermally connected to a heat sink. Heat dissipates from the heat sink through the liquid-cooled walls of the chassis by conduction and to the interior of the chassis by convection and radiation. An external pump circulates a liquid, such as water, through the walls of the chassis, the liquid being cooled at an external heat exchanger.

In FIG. 2 a first cooling assembly comprising a thermoelectric element is arranged between the heat generating components on the PCB and the second cooling assembly (heat pipe and heat spreader assembly), so as to achieve an enhanced cooling effect. The second cooling assembly is arranged to cool the thermoelectric element.

FIG. 3 shows an overall view of a converter (generator) chassis 50 in accordance with the principles illustrated in FIG. 2. FIG. 4 shows a detail of FIG. 3. In the views of FIGS. 3 and 4, walls are hidden for clarity. A wall 52 of the chassis is provided with channels for a flow of a cooling liquid. A plurality of power electronic components, such as IGBTs 62 (Isulated-Gate Bipolar Transistors) are provided along an interior wall of the chassis 50. A first cooling assembly including a thermoelectric element 56 is provided on or in the vicinity of a surface of the IGBTs 62, such as on or near a surface of heat-generating components on PCBs of the IGBTs. It will be appreciated that a plurality of such thermoelectric elements may be provided. A second cooling assembly 100 including e.g. a heat pipe as described in further detail below is further provided to cool the thermoelectric element.

The second cooling assembly 100 is connected to a heat sink 60 via a thermally conductive element 58.

FIG. 5 illustrates the working principle and an embodiment of a second cooling assembly 100 according to the invention. The cooling assembly 100 comprises a sealed container 101 containing a working fluid. One first part or section 102 of the container is arranged in the high temperature region 103 near or next to the heat-generating component or parts to be cooled (not shown) whereas a second section 104 of the container is arranged in a region 105 of a lower temperature. Heat exchange through the wall of the container in the region of high temperature 103 make the working fluid evaporate in the first or evaporating region 106 of the container as illustrated by the arrows 107. Due to the higher vapour pressure here, a part of the vaporized working fluid then travels or conveys 105 from the first or evaporating region 106 to the so-called second or condensing region 108 of the container. Here the working fluid condensate 109 releasing its latent heat of vaporization due to the heat exchange through the container wall with the surrounding region of lower temperature 105. The condensed working fluid then is conveyed back 110 to the first region 102 of the container in the structure 111. In the heat exchanger embodiment in FIG. 1 this fluid transport is obtained by the use of a wick structure 111 lined to at least a portion of the inner wall 112 of the container 101 and in which the fluid is conveyed due to capillary actions. The wick structure 108 can for instance be of a sintered, powder metal screen (mesh screen), sintered metal powders, sintered metal powder grooves and/or sintered slab. The wick material may be made of Copper and its alloys.

In another embodiment of the heat exchanger, the condensed working fluid may also be transported or conveyed back to the first region 106 of the container by gravity forces, which is the case in the cooling assembly illustrated in FIG. 6.

The container 101 containing the working fluid may be in a shape of an elongated pipe-like member as illustrated in FIG. 1 and the pipe-like member may for instance be tubular, annular, bent, flat, and looped etc. thereby being able to be custom-fit to the specific needs arising from the actual geometrical constraints where the heat exchanger is to be placed. The pipe-like member can be made with a diameter from 2 mm and up and can for instance be made of Copper and its alloy materials. In an embodiment, the wick structure 111 is covering the entire inner pipe wall surfaces (but not necessarily the end walls) thereby completely surrounding or encapsulating an inner cavity if seen in from a cross sectional view.

The first (evaporating) and second (condensing) sections 102,104 of the container are advantageously of a conductive material enhancing the heat exchange between the surroundings and the working fluid. This is obtained by integrating or embedding the first and/or second regions of the container in a casing or block of for instance a Copper, Aluminium, or some conductive polymer material by e.g. soldering, welding, brazing, or by using press fit with a thermal interface material. The size and dimensions of the different parts of the container regions must be chosen based on the actual load and capacity conditions.

The center section of the container between the evaporating and condensing regions is advantageously adiabatic or to some extent heat insulated in order to ensure the heat from the heat-generating component(s) to be transported all the way or at least as far as possible out towards the second region of lower temperature.

Many different working fluids working optimally in different temperature intervals may be used in the heat exchanger, such as water (301-473K), Methanol (283-403K), Ethanol (273-403K), Ammonia (213-373K), or Acetone. Combinations are also possible according to the different load and operating conditions. Moreover the working fluid selection can be done with a view to the wind regime or regional climate area.

In the cooling assembly embodiments shown in perspective views in FIGS. 6 and 7 the container 101 is arranged in a housing 201 where the container containing the working fluid attains the shape of a chamber 202. The heat from the heat-generating components (not shown) is here exchanged through the base plate(s) 205 to one (FIG. 7) or two (FIG. 6) different first evaporating regions 106 of the container from where the working fluid evaporates later condensing in the colder second or condensing region 108. Here, the cooling of the second or condensing region 108 is enhanced by the arrangement of a plurality of fins 204 on the outer surface 203 of the heat exchanger 100. Compared to a conventional heat exchanger where the heat from the hot components is led to the cooling fins 204 through a massive metal block, the use of the working fluid as disclosed here increases the efficiency and heat transfer coefficient of the heat exchange tremendously in that the vapor chamber with the working fluid enables a more even distribution of the heat to the whole surface of the second or condensing region 108. In other words the heat flux becomes more uniform.

The cooling fins 204 may be of various types such as for example pins, elliptical, cross-cut or straight and may be extruded, bonded, or in a folded fin configuration etc.

FIG. 8 illustrates a wind turbine nacelle 400 comprising a number of heat-generating components 401 within the nacelle. Due to the construction of the heat exchangers according to the present invention these can advantageously be applied to cool a broad size range of heat-generating components such as heavy-duty elements such as for example generators 410, gear boxes 402, or transformers and down to small power electronic components 403. According to the invention, the natural airflow 404 over the outside nacelle surfaces can be used to dissipate the heat from the different heat-generating component 401 by placing the parts comprising the condensing regions of a number of heat exchanger(s) near or on the nacelle exterior surfaces. For instance the cooling fins 204 could be placed reaching outside the nacelle, on a side, or on the top of the nacelle wherever appropriate. As the pipe-like members forming the second cooling assembly according to the invention can be of considerable length it is also possible to cool components placed some distance within the nacelle by the use of the ambient air. Further, geometrical constraints on the available space for the heat exchangers can also more easily be circumvented by use of pipe-like members which as mentioned previously need not be straight.

To enhance the efficiency of the heat exchanger even further, the heat exchanger 100 may in one embodiment of the invention be built up by two or more modules of connected or combined sub heat exchangers 501 built up in parallel and in succession as sketched in FIG. 9. Here, the cooling assembly 100 comprises a plurality of fins 204 arranged to an outer surface in a low temperature region. The fins 204 are connected to a first sub heat exchanger 502 similar to the embodiment shown in the FIGS. 2 and 3 comprising a housing 503 with an inner container and a working fluid (not shown). However, instead of connecting the heat-generating components (as illustrated by the different boxes 503) directly to the evaporating section of this first sub heat exchangers 502, the heat-generating components 503 are connected to a module panel comprising a number of second sub heat exchangers 504 of pipe-like shapes the condensing sections 104 of which then in turn being connected to the first sub heat exchanger 501. Hereby is obtained that the overall efficiency or heat transfer coefficient of the heat exchanger system 100 is increased partly as the pipe-like members can distribute the heat more evenly to a larger evaporating section of the first sub heat exchanger 502 compared to what is the case in the embodiments as shown in FIGS. 6 and 7 where the heat from the components to be cooled enters through the base plate(s) 205 with comparatively small area. The so-called hot spot temperatures otherwise often a problem with conventional heat exchangers are hereby reduced or even eliminated.

In FIG. 10, the thermal resistance 600 of a heat exchanger according to the invention is illustrated as a function of the wind speed 601 in the low temperature region. The chart shows how the thermal resistance decreases with increasing wind speeds implying that the heat transfer coefficient and thereby also the heat transfer capability of the heat exchanger increases with higher air velocities. The thermal resistance is also a function of the fin arrangement and the dependency is shown in the figure for three different types; namely for an elliptical 604, cross-cut 603, and straight 602 fin arrangement.

This effect has been exploited by the embodiment of a nacelle with a heat exchanger as sketched in FIG. 11. Here, the part of the heat exchanger 100 arranged outside the nacelle wall 405 may further be partly covered or shielded off with a screen 406 shaped to enhance and increase the wind flow 404 across the cooling surfaces (fins 204) of the heat exchanger thereby increasing its heat transfer coefficient.

Figure 12:
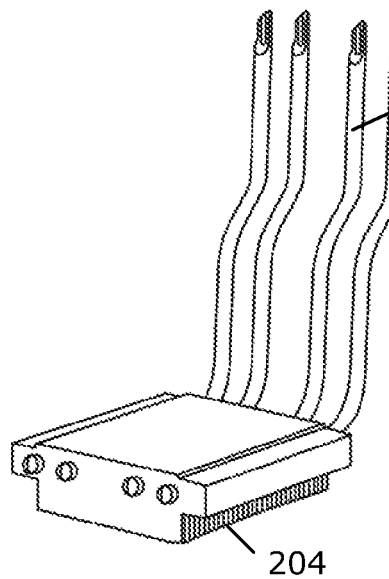

FIGS. 12-16 illustrate various embodiments of heat exchangers according to the present invention. In FIG. 12, the heat exchanger comprises a plurality of pipe-like members 801 containing a working fluid and a wick structure as described previously. The free ends of the pipe-like members 801 may be arranged at, on or near a heat-generating component within the wind turbine nacelle. The opposite ends of the pipe-like members 801 are embedded in a case, which is integral with or connected to a plurality of fins 204, arranged at a region of a relatively low temperature within the nacelle or at an exterior surface thereof.

Figure 13:
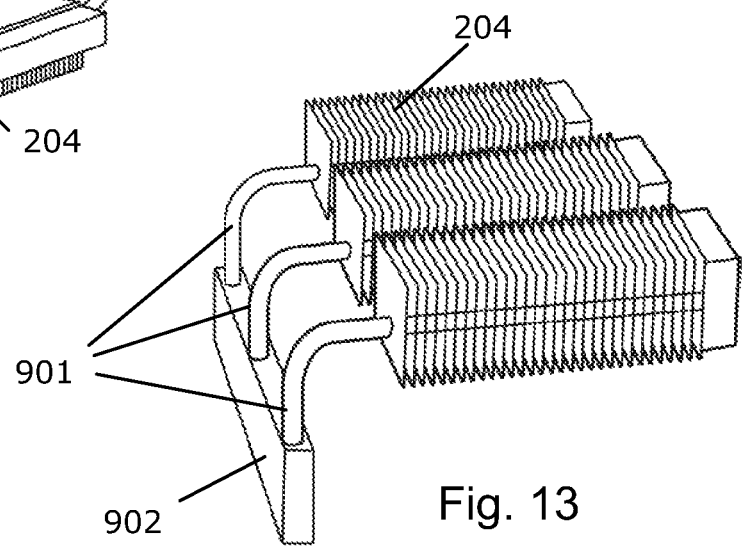

In the embodiment of FIG. 13, the heat exchanger comprises a plurality of pipe-like members 901. That end of the pipe-like members, which is to be arranged at the region of a relatively high temperature, is embedded in a common heat-transmitting support element 902, whereas the opposite ends of the pipe-like members 901 are individually embedded in cases with fins 204.

Figure 14:
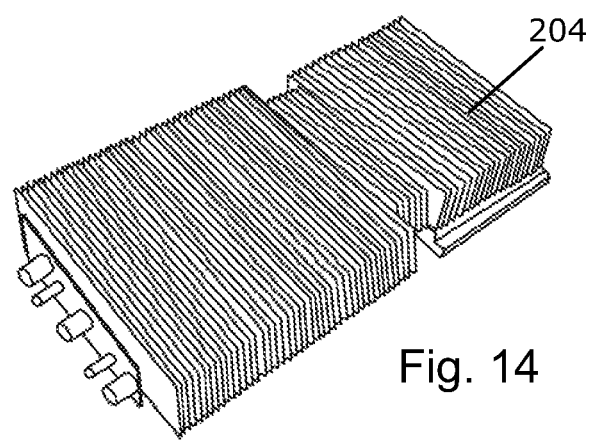

FIG. 14 shows an embodiment, in which the pipe-like members are embedded in fin-supporting elements in the regions of relatively high temperature as well as in the regions of relatively low temperature.

Figure 15:
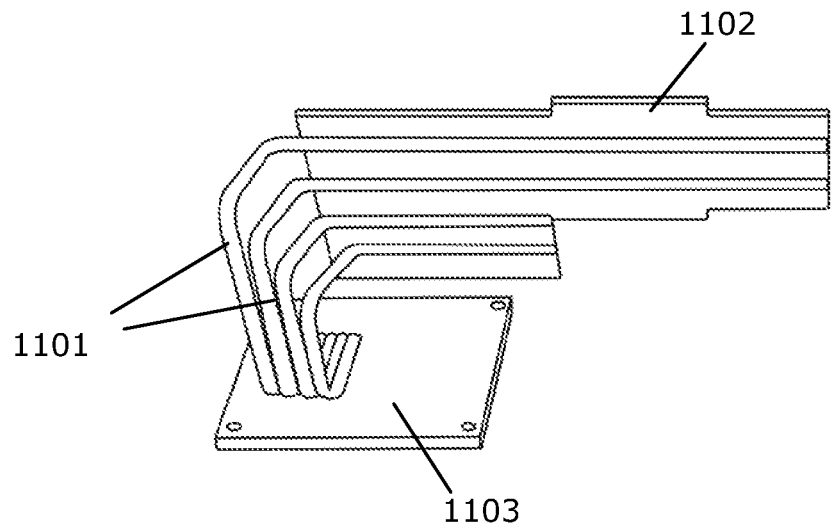

In a further embodiment as shown in FIG. 15, the pipe-like members 1101 are at one end connected to a first plate 1102 and at a second end to a second plate 1103. One of the plates 1102 and 1103 is intended to be at the region of relatively high temperature, whereas the other one of the plates is intended to be at the region of relatively low temperature.

Figure 16:
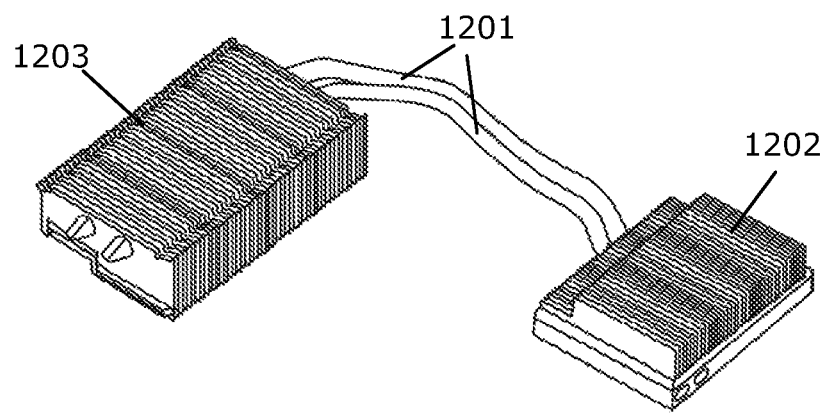

FIG. 16 illustrates a further example of an embodiment, in which the pipe-like members 1201 are embedded in fin-supporting elements 1202, 1203, one set of the fin-supporting elements being in the region of relatively high temperature, and the other set of fin-supporting elements being in the region of relatively low temperature.

The invention claimed is:

1. A wind turbine nacelle, comprising:
at least one heat-generating component housed within the nacelle; and
at least one heat exchanger assembly for cooling said at least one heat-generating component, wherein the at least one heat exchanger assembly comprises a first cooling assembly and a second cooling assembly,
wherein the first cooling assembly comprises:
at least one thermoelectric element having a first section arranged in a first region of relatively high temperature in contact with the heat-generating component or in the vicinity thereof, the thermoelectric element further having a second section arranged in a second region of a relatively low temperature, the thermoelectric element being configured to transfer heat from the first region of relatively high temperature to the second region of relatively low temperature with consumption of electrical energy; and
a source of electrical energy connected to the thermoelectric element; and
wherein the second cooling assembly comprises:
a container which contains a working fluid, wherein the container is arranged such that a first section of the container is in a third region of relatively high temperature in contact with the heat-generating component or in the vicinity thereof, and such that a second section of the container is in a fourth region of relatively low temperature remote from the heat-generating component, wherein the working fluid is capable of evaporating at the first section of the container due to heat exchange with the high temperature region through a first wall of the first section of the container, and wherein the evaporated working fluid is capable of being conveyed within the container from the first region thereof to the second region and of condensing at the second section of the container due to heat exchange with the low temperature region through a second wall of the second section of the container; and
a structure allowing the condensed working fluid to be conveyed back from the second section of the container to the first section thereof.

2. The wind turbine nacelle according to claim 1, wherein the container containing said working fluid is arranged to transfer heat away from the thermoelectric element, with the first section of the container being arranged in contact with or in the vicinity of the second section of the thermoelectric element.

3. The wind turbine nacelle according to claim 1, wherein the first cooling assembly further comprises a control system configured to control the supply of electrical energy to the thermoelectric element, so as to control its heat pumping capacity.

4. The wind turbine nacelle according to claim 3, wherein the control system comprises a unit for determining an operating condition of the wind turbine, the control system being configured to control the supply of electrical energy to the thermoelectric element in response to said operating condition.

5. The wind turbine nacelle according to claim 1, wherein the at least one heat-generating component comprises a generator for converting mechanical energy of a rotational shaft of the wind turbine nacelle into electrical energy.

6. The wind turbine nacelle according to claim 5, wherein the generator comprises a control module having at least one printed circuit board (PCB), and wherein the at least one heat exchanger assembly is arranged to transfer heat away from the at least one PCB.

7. The wind turbine nacelle according to claim 3, wherein the heat-generating component includes a control module having at least one printed circuit board (PCB), and wherein the supply of electrical energy to the thermoelectric element is controllable to maintain a surface temperature of the PCB below 50 degrees Celsius.

8. The wind turbine nacelle according to claim 1, wherein the heat exchanger assembly further comprises a heat sink thermally connected to the thermoelectric element and/or to the container containing said working fluid, the heat sink being arranged to transfer heat to its surroundings by convection and/or radiation heat transfer.

9. The wind turbine nacelle according to claim 8, wherein the heat exchanger assembly is arranged within a housing or chassis, and wherein the wind turbine nacelle further comprises a cooling system for cooling the housing or chassis.

10. The wind turbine nacelle according to claim 9, wherein said cooling system comprises a closed cooling circuit comprising:
 a pump for circulating a cooling medium in the cooling circuit along or across the housing or chassis; and
 a heat exchanger for transferring heat away from the cooling medium in the circuit.

11. The wind turbine nacelle according to claim 10, wherein the heat sink is arranged in contact with or in the vicinity of a conduit of the closed cooling circuit, so as to allow heat from the heat sink to be transferred to the cooling medium by conduction.

12. A wind turbine comprising a wind turbine nacelle according to claim 1.

13. A method of cooling at least one heat-generating component housed within a wind turbine nacelle, the method comprising:
 providing at least one heat exchanger assembly for cooling said at least one heat-generating component, wherein the at least one heat exchanger assembly comprises a first cooling assembly with at least one thermoelectric element;
 arranging a first section of the at least one thermoelectric element in a first region of relatively high temperature in contact with the heat-generating component or in the vicinity thereof;
 arranging a second section of the at least one thermoelectric element in a second region of a relatively low temperature;
 supplying electrical energy to the thermoelectric element so as to cause it to transfer heat from the first region of relatively high temperature to the second region of relatively low temperature;
 providing the at least one heat exchanger assembly with a second cooling assembly including a container which contains a working fluid;
 arranging a first section of the container in a third region of relatively high temperature in contact with the heat-generating component or in the vicinity thereof to evaporate the working fluid in the container;
 arranging a second section of the container in a fourth region of relatively low temperature remote from the heat-generating component to condense the working fluid in the container; and
 conveying the condensed working fluid from the second section of the container to the first section of the container.

14. A converter for a wind turbine having a nacelle, the converter comprising:
 a housing or chassis positioned within the nacelle of the wind turbine, wherein heat-generating power electronic components are positioned within the housing or chassis;
 a cooling system comprising a closed cooling circuit in or on the housing or chassis comprising a pump for circulating a cooling fluid in the cooling circuit and a heat exchanger for transferring heat away from the cooling fluid; and
 a first cooling assembly comprising:
  at least one thermoelectric element having a first section arranged in a first region of relatively high temperature in contact with the heat-generating component or in the vicinity thereof, the thermoelectric element further having a second section arranged in a second region of a relatively low temperature, the thermoelectric element being configured to transfer heat from the first region of relatively high temperature to the second region of relatively low temperature with consumption of electrical energy; and
  a source of electrical energy connected to the thermoelectric element.

15. The converter according to claim 14, further comprising a second cooling assembly, comprising:
 a container which contains a working fluid, wherein the container is arranged such that a first section of the container is in a third region of relatively high temperature in contact with the heat-generating component or in the vicinity thereof, and such that a second section of the container is in a fourth region of relatively low temperature remote from the heat-generating component, wherein the working fluid is capable of evaporating at the first section of the container due to heat exchange with the high temperature region through a first wall of the first section of the container, and wherein the evaporated working fluid is capable of being conveyed within the container from the first region thereof to the second region and of condensing at the second section of the container due to heat exchange with the low temperature region through a second wall of the second section of the container; and
 a structure allowing the condensed working fluid to be conveyed back from the second section of the container to the first section thereof.

16. The converter according to claim 15, wherein the container containing said working fluid is arranged to transfer heat away from the thermoelectric element, with the first section of the container being arranged in contact with or in the vicinity of the second section of the thermoelectric element.

17. The converter according to claim 14, wherein the first cooling assembly further comprises a control system configured to control the supply of electrical energy to the thermoelectric element, so as to control its heat pumping capacity.

18. The converter according to claim 17, wherein the control system comprises a unit for determining an operating condition of the wind turbine, the control system being configured to control the supply of electrical energy to the thermoelectric element in response to said operating condition.

19. The converter according to claim 17, wherein the heat-generating component includes a control module having at least one printed circuit board (PCB), and wherein the supply of electrical energy to the thermoelectric element is controllable to maintain a surface temperature of the PCB below 50 degrees Celsius.

20. The converter according to claim 15, further comprising a heat sink thermally connected to the thermoelectric element and/or to the container containing said working fluid, the heat sink being arranged to transfer heat to its surroundings by convection and/or radiation heat transfer.

21. The converter according to claim 20, wherein the heat sink is arranged in contact with or in the vicinity of a conduit of the closed cooling circuit, so as to allow heat from the heat sink to be transferred to the cooling medium by conduction.

* * * * *